April 13, 1943.　　　　E. D. T. NORRIS　　　　2,316,707
CONTROL OF AUTOMATIC VOLTAGE REGULATORS
Filed March 31, 1941　　　2 Sheets-Sheet 1

April 13, 1943.                E. D. T. NORRIS                 2,316,707
                CONTROL OF AUTOMATIC VOLTAGE REGULATORS
                    Filed March 31, 1941           2 Sheets-Sheet 2
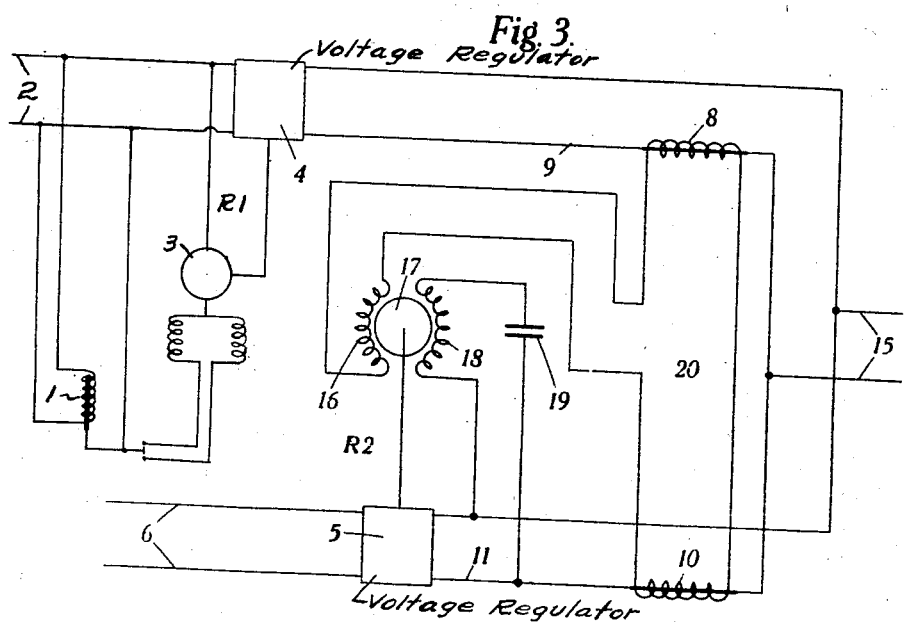
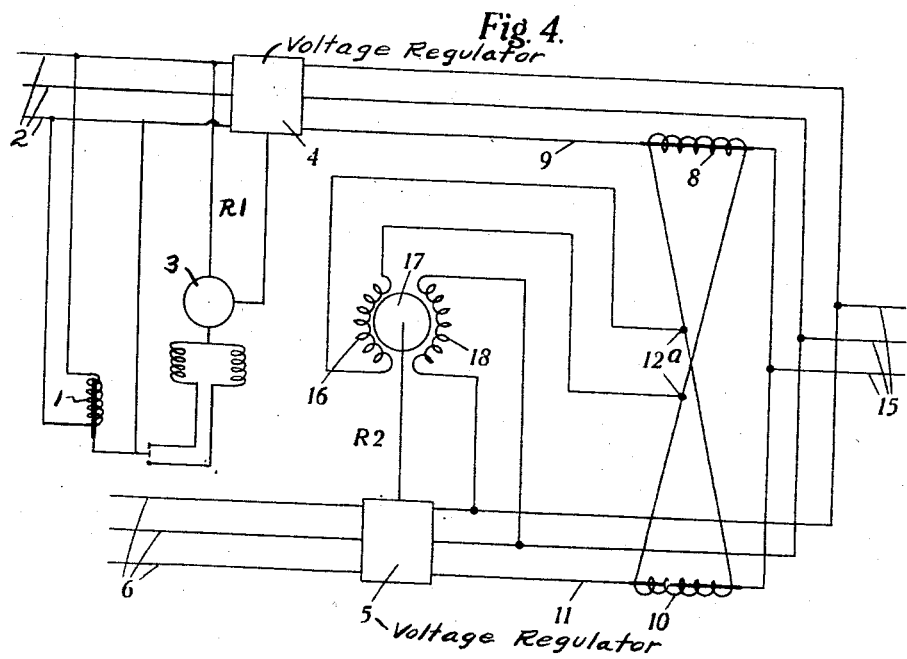
INVENTOR.
BY Eric D. T. Norris
Walter Suma, ATTORNEY.

Patented Apr. 13, 1943

2,316,707

UNITED STATES PATENT OFFICE 2,316,707

CONTROL OF AUTOMATIC VOLTAGE REGULATORS

Eric Douglas Tobias Norris, Hollinwood, England, assignor to Ferranti Electric Incorporated, New York, N. Y.

Application March 31, 1941, Serial No. 386,062
In Great Britain April 4, 1940

11 Claims. (Cl. 171—119)

This invention relates to the control of automatic voltage-regulators such as induction regulators, regulators employing on-load tap-changing switch gear, moving coil regulators, and the like. More specifically, the invention relates to control gear for the operation of two voltage-regulators connected in parallel. It is an object of the present invention to provide improved equalizing means for use with two voltage regulators operating in parallel, which eliminates the necessity for a directional relay and which requires practically no attention after installation.

In one known arrangement, the master regulator includes a single relay, and the follower regulator includes three relays, one of these being a directional relay and the others auxiliaries. According to whether the voltage in the master regulator rises or falls, determines which of the auxiliaries is energised, and as these are arranged to actuate the regulator in opposite directions, determines whether the voltage in the follower regulator rises or falls to assume equality with that in the master regulator.

It is well-known to be essential that when two voltage-regulators are operated in parallel to supply a common load, the voltages which they supply should be the same, in order to avoid the setting up of circulating currents which would give rise to unequal distribution of load current. This uniformity is usually achieved by making one of the regulators (referred to herein as a master regulator) directly responsive to the regulation requirements of the circuit under control, and by providing equalising means for causing the other regulator to follow the master regulator.

In the accompanying drawings, diagrammatic illustrations are to be found, one of which is representative of the said previously-known arrangement and the others of which illustrate some alternative forms of the present invention:

Figs. 2 and 3 are similar diagrams of two arrangements according to the present invention, also for a single-phase system; and Fig. 4 is a further diagram of an arrangement according to the present invention but adapted for a three-phase system.

Figure 1:
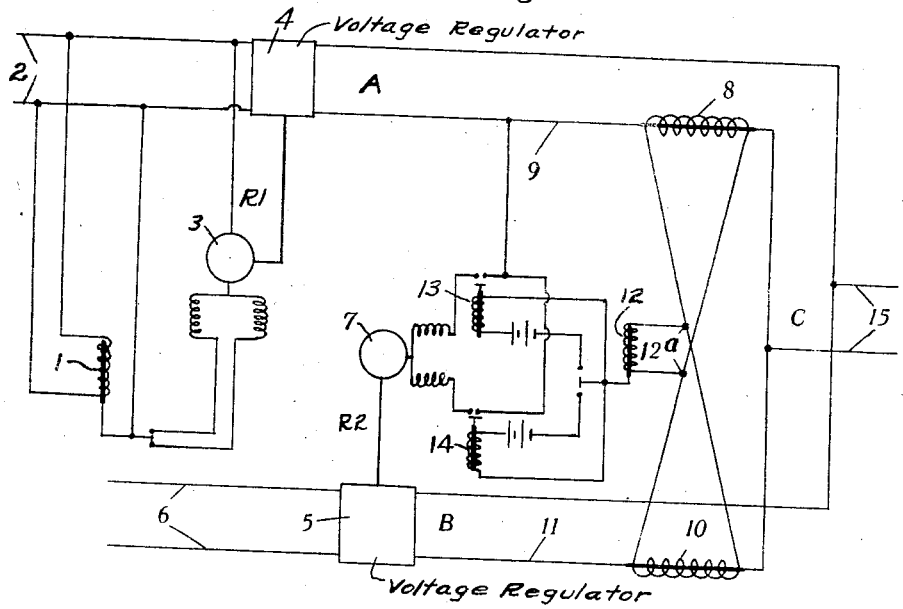
Fig. 1 is a circuit diagram of the known arrangement for equalising two voltage-regulators arranged in parallel in a single-phase system, the various components in the circuit being shown symbolically.

In the known arrangement shown in Fig. 1, the two voltage-regulators are indicated generally at $r^1$ and $r^2$ respectively and are arranged in the parallel limbs A and B of the supply circuit which connect with a common load (not shown) at C. The master regulator $r^1$ comprises a relay 1 connected across the conductors 2 of the limb A, a motor 3 adapted to be operated by the relay 1 and a voltage-regulating apparatus 4 controlled by the motor. The other regulator $r^2$ includes the voltage-regulating apparatus 5 which is associated with the line conductors 6 in the limb B and is controlled by the motor 7.

A current transformer 8 is connected in one of the line conductors 9 from the regulating apparatus 4, this conductor forming the primary winding of the transformer, and another current transformer 10 is similarly connected in the corresponding line 11 from the other voltage-regulating apparatus 5. The secondary windings of the current transformers are connected in series to form a closed circuit in which the induced potentials assist each other and a directional relay 12 is connected across the secondary terminals 12a. The directional relay 12 is adapted to energise the electric motor 7 by way of one or other of two auxiliary relays 13, 14, which are susceptible to changes of phase in the current carried by the relay 12 and which are adapted respectively to energise the motor 7 for rotation in opposite directions. The voltage-regulators are connected to the common load C at 15.

Since the two secondary windings of the transformers 8 and 10 are in series, a current circulates in the closed circuit, the value of which current depends upon the load currents in the two associated lines 9 and 11. When the voltages supplied by the two regulators are the same, the load is shared equally by the two lines A and B and no current passes through the directional relay 12. However, when the master regulator $r^1$ effects a change of voltage in the line A as a result either of manual operation or of automatic operation occasioned by a change in the voltage of the circuit under control, and if the current in the line B is not similarly affected in exact synchronism, the currents in the two lines 9 and 11 become unequal and the directional relay 12 receives from the closed circuit a current, the phase of which in relation to the line voltage depends upon which of the two regulators $r^1$ and $r^2$ is giving the greater "buck" or "boost." According to the phase of this current from the closed circuit the directional relay 12 energises one or other of the auxiliary relays 13, 14 which in turn actuates the electric motor 7 in a corresponding direction to cause it to effect operation of the follower regulating apparatus 5 and thus make the voltage supplied by it in the line B the same as that supplied by the master regulator $r^1$ in the line A. When this equality is achieved, current ceases to flow in the closed circuit and the directional relay 12 therefore resets in readiness for any subsequent change.

The known method just described necessitates the use of three relays 12, 13 and 14 two of which must operate each time the motor 7 is to be energised, and all of which require periodic attention. Furthermore, directional relays are usually a source of trouble due to the nature of their construction.

Figure 2:
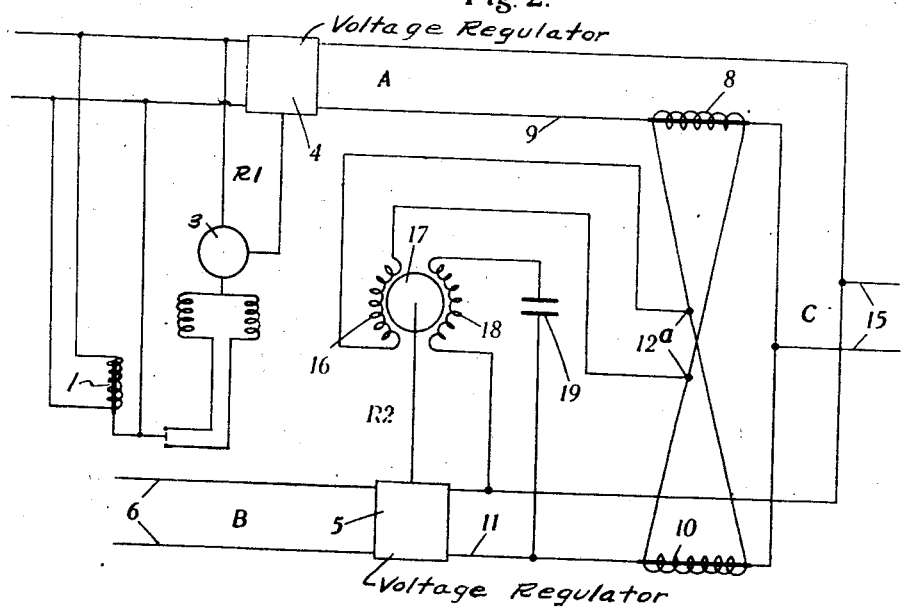

Three of the possible forms of the invention are shown in Figs. 2, 3 and 4 respectively.

Referring first to Fig. 2 there are the two limbs A and B of the parallel circuit, uniting for the load at C and the voltage-regulators $r^1$ and $r^2$ are provided, the master regulator $r^1$ being precisely as shown in Fig. 1. The primaries of the two current transformers 8 and 10 are connected in the corresponding lines 9 and 11 from the two regulators $r^1$, $r^2$ and the secondary windings of the transformers are connected in series to form a closed circuit in which the two secondary potentials assist each other, also as shown in Fig. 1. However, the regulator $r^2$ includes a capacitor type split-phase motor 17, one energising winding 16 of which is connected across the two terminals 12a of the closed circuit which includes the said secondary windings. The other energising winding 18 of the motor 17 is connected across the supply which the regulators are to control, in this case across the limb B there being a condenser 19 in series with this winding 18 for the purpose of phase displacement. The voltage-regulating apparatus 4 in the regulator $r^1$ is operated in known manner, in accordance with the regulation requirements of the circuit under control, whilst the voltage-regulating apparatus 5 in the regulator $r^2$ is adapted to be operated by the capacitor motor 17.

As in the case described above with reference to Fig. 1, when the voltages provided by the two regulators $r^1$ and $r^2$ are the same, the load is shared equally and no current flows in the closed circuit nor in the winding 16 of the motor 17. When the voltage provided by the master regulator $r^1$ is varied and the load is thereupon shared unequally by the regulators, a resultant current flows in the said closed circuit and in the winding 16 of the motor. Since winding 18 of the motor is connected permanently across the supply by way of the condenser 19, it takes a leading current therefrom and the motor 17 is set in rotation to actuate voltage-regulating apparatus 5 and adjust the voltage buck or boost provided thereby.

The direction of rotation of the motor 17, and hence of the adjustment of the voltage by the follower regulating apparatus 5, depends upon the phase of the current flowing in winding 16 of the motor. Thus, if the voltage controlled by the master regulator $r^1$ increases, the direction of current in winding 16 is such that the motor 17 rotates in the required direction to increase the voltage provided by the follower regulating apparatus 5, and vice versa.

It will be seen that the several components in the circuit are so associated together that, owing to phase displacement between the currents in the windings 16 and 18 of the motor 17, the energising of the winding 16 produces a starting torque to operate the motor and thereby operate the follower voltage-regulator. When the voltages in the lines A and B have again become equal, current ceases to flow in the winding 16, and the motor comes to rest.

Referring now to Fig. 3 which shows another embodiment of the invention, the secondary windings of the current transformers 8 and 10 are connected in series but in such a manner that the induced potentials oppose each other. The secondary circuit 20 is closed by way of one energising winding 16 of a motor 17 similar to that described above. Other connections are similar to those of the preceding embodiment.

When the voltage supplied by the two regulators $r^1$ and $r^2$ are the same there is no resultant potential in the secondary circuit 20 of the two current transformers 8 and 10 and hence no current flows in winding 16 of the motor 17 connected therein. When the voltages provided by the regulators become unequal a current is set up in the secondary circuit 20 the phase of which depends upon which of the two regulators has the higher output voltage. The direction of this current in passing through the motor winding 16 determines the direction of rotation of the motor 17 which operates regulating apparatus 5 in the line B until the voltage supplied by it is equal to that supplied by apparatus 4 in line A. As in the preceding case, when the voltages become equal, current ceases to flow in the circuit of the secondary windings and the motor 17 comes to rest.

When more than two voltage-regulators are to be operated in parallel according to this invention further equalising means will be employed, either between each additional regulator and the master regulator that is each to follow the master regulator in direct succession, or between each additional regulator and a follower regulator already connected to follow the master regulator.

It will be apparent that instead of employing a condenser as described above, the necessary phase difference between the currents in the two windings of the motor 17 may be obtained by the use of any other suitable phase displacing device, for example, by the inclusion of a high resistance in series with the winding 18 in place of the condenser 19.

Referring finally to Fig. 4, the invention is illustrated as applied to a three-phase system, also having the parallel limbs A and B uniting to take a load at C. In this arrangement, the voltage supply to the windings of the motor 17 may be derived from any suitable part of the system. As shown, the current transformers 8 and 10 with their associated motor winding 16 are connected in one phase, whilst winding 18 is connected across the other two phases, thus producing a phase difference of approximately 90° between the currents in the windings 16 and 18. Alternatively winding 18 could be connected across the phase to which current transformer 10 is connected and one other phase, thus producing a phase difference of approximately 90° between the currents in the windings 16 and 18 even though there may not be this difference between the voltages. Again, the winding 18 could be connected across any two other conductors providing a phase displacement, e. g. one phase and neutral.

Obviously, a three-phase arrangement as shown in Fig. 4 could be modified so that the secondaries of the transformers oppose each other (as in Fig. 3) instead of assisting each other.

If necessary, step-up or step-down transformers may be employed to connect the motor windings to their respective supplies.

What I claim is:

1. A voltage supply system having two voltage regulators operating in parallel lines of the system one being a master regular and the other a follower regulator, and the follower being energised inductively by differences of current between the two parallel lines, having also a capacitor-type split-phase motor to operate the follower regulator, one of the windings of the motor being connected to receive the differential induced current, and the other being connected with one of the parallel lines.

2. A voltage supply system wherein the current source is connected with the load by two parallel supply lines; and comprising in combination a master voltage-regulator in one of the supply lines to be operated according to the requirements of the load, a follower voltage-regulator in the other supply line, a current transformer in each of the supply lines, their secondaries being connected in series as a closed circuit and their primaries being constituted by corresponding current paths in the two lines, an electric motor having two energising windings formed to provide a starting torque when energised respectively by currents out of phase with each other, one of the windings being connected to receive current from the said closed circuit and the other being connected to receive current from one of the supply lines, means causing one of the winding currents to be out of phase with the other, and means connecting the motor to the follower regulator to operate the regulator until the resultant equalising of the current in the two supply lines causes the current in the said closed circuit to cease and the motor to stop.

3. A voltage supply system according to claim 2, wherein the said other winding is connected across the supply line which is controlled by the follower regulator, and wherein the phase-displacing means is a condenser in series with that winding.

4. A voltage supply system according to claim 2, wherein the said other winding is connected across the supply line which is controlled by the follower regulator, and wherein the phase-displacing means is a high resistance in series with that winding.

5. A voltage supply system wherein the current source is connected with the load by two parallel supply lines; and comprising in combination a master voltage-regulator in one of the supply lines, to be operated according to the requirements of the load, a follower voltage-regulator in the other supply line, an electric motor having two energising windings formed to provide a starting torque when energised respectively by currents out of phase with each other, a current transformer in each of the supply lines, their primaries being constituted by corresponding current paths in the two lines and their secondaries being connected in series with each other and with one of the windings of the motor and so that the winding is energised only when the currents in the two lines are unequal, the other winding being connected to receive current from one of the supply lines, means for displacing the phase of the current in one of the windings with respect to that in the other winding and means connecting the motor to the follower regulator to operate that regulator until the resultant equalising of the currents in the two supply lines causes the current in the transformers to cease and the motor to stop.

6. A voltage supply system according to claim 5, wherein the said other winding is connected across the supply line which is controlled by the follower regulator, and wherein the phase-displacing means is a condenser in series with that winding.

7. A voltage supply system according to claim 5, wherein the said other winding is connected across the supply line which is controlled by the follower regulator, and wherein the phase-displacing means is a high resistance in series with that winding.

8. A three-phase voltage supply system wherein the current source is connected with the load by two parallel supply lines; and comprising in combination a master voltage-regulator in one of the supply lines to be operated according to the requirements of the load, a follower voltage-regulator in the other supply line, an electric motor having two energising windings formed to provide a starting torque when energised respectively by currents out of phase with each other, a current transformer in each supply line and in the same phase, their primaries being constituted by that phase and their secondaries being connected together as a closed circuit, one of the windings of the motor being connected across that closed circuit and so that current flows in that winding only when the currents in the two lines are unequal and the other winding being connected across any two conductors providing a phase displacement in one of the supply lines, and means coupling the motor to the follower regulator for consequent voltage change.

9. A system according to claim 8, wherein the said other winding is connected across the two phases of the line controlled by the follower regulator which do not include the transformer.

10. A three-phase voltage supply system wherein the current source is connected with the load by two parallel supply lines; and comprising in combination a master voltage-regulator in one of the supply lines to be operated according to the requirements of the load, a follower voltage-regulator in the other supply line, an electric motor having two energising windings formed to provide a starting torque when energised respectively by currents out of phase with each other, a current transformer in each of the supply lines and in the same phase their primaries being constituted by that phase and their secondaries being connected in series with each other and with one of the windings of the motor, and so that the winding is energised only when the currents in the two lines are unequal, the other winding being connected across any two conductors providing a phase displacement in one of the lines, and means coupling the motor to the follower regulator for consequent voltage change.

11. A system according to claim 10 wherein the said other winding is connected across the two phases of the line controlled by the follower regulator which do not include the transformer.

ERIC DOUGLAS TOBIAS NORRIS.